(12) United States Patent
Ishikawa et al.

(10) Patent No.: US 7,373,066 B2
(45) Date of Patent: May 13, 2008

(54) OPTICAL WAVEGUIDE DEVICE AND MULTIPLE OPTICAL WAVEGUIDE DEVICE

(75) Inventors: Hiroshi Ishikawa, Hitachi (JP); Tomoyuki Hakuta, Hitachinaka (JP); Makoto Horie, Hitachi (JP); Hitoshi Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/582,458

(22) Filed: Oct. 18, 2006

(65) Prior Publication Data

US 2007/0086717 A1    Apr. 19, 2007

(30) Foreign Application Priority Data

Oct. 19, 2005   (JP) .............................. 2005-304406

(51) Int. Cl.
*G02B 6/10*   (2006.01)
(52) U.S. Cl. .................. 385/131; 385/14; 385/129; 385/130; 385/132
(58) Field of Classification Search ................. 385/14, 385/129, 130, 131, 132, 141
See application file for complete search history.

(56) References Cited

U.S. PATENT DOCUMENTS

| 4,425,146 | A  | * | 1/1984 | Izawa et al. ................... 65/420 |
| 5,917,980 | A  | * | 6/1999 | Yoshimura et al. ......... 385/129 |
| 6,996,324 | B2 | * | 2/2006 | Hiraka et al. ................ 385/141 |
| 7,221,844 | B2 | * | 5/2007 | Takahashi et al. ........... 385/131 |
| 2006/0018589 | A1 | * | 1/2006 | Takahashi et al. ............. 385/14 |
| 2007/0147766 | A1 | * | 6/2007 | Mattsson et al. ........... 385/142 |

FOREIGN PATENT DOCUMENTS

JP    2001-183538    7/2001    ............... 385/14 X

* cited by examiner

*Primary Examiner*—Brian M. Healy
(74) *Attorney, Agent, or Firm*—Antonelli, Terry, Stout & Kraus, LLP.

(57) ABSTRACT

In a multiple optical waveguide device, a transparent plate is bonded or joined on the top surface of a clad with which optical circuits and quartz glass substrates are covered, and optical reflection film is provided on the fringing area or the whole area of a joint surface of the transparent plate with the clad. Optical circuits or waveguide patterns can be recognized easily by visual inspection.

6 Claims, 3 Drawing Sheets

OPTICAL WAVEGUIDE DEVICE AND MULTIPLE OPTICAL WAVEGUIDE DEVICE

BACKGROUND OF THE INVENTION

The present invention relates to an optical waveguide device in which an optical circuit is provided on a quartz glass substrate, and a multiple optical waveguide device in which a plurality of optical circuits are provided on a quartz glass substrate.

In a conventional optical waveguide device which is a typical optical device, an optical circuit is provided on a quartz glass substrate. The optical circuit and the quartz glass substrate are covered with a clad. In addition, a transparent plate (for instance, quartz glass) which protects the edge of the optical device is bonded on the surface of the clad.

The conventional multiple optical waveguide device disclosed in Japanese Patent Application Laid-Open No. 2001-183538 comprises a plurality of optical circuits and waveguide patterns which indicate the standard of cutting off when dicing, provided on a quartz glass substrate. It further comprises a clad with which the optical circuits, the waveguide patterns, and the quartz glass substrate are covered, and a transparent plate bonded on the surface of the clad. The optical waveguide device is made by cutting the multiple optical waveguide device along the waveguide patterns by using a dicing saw.

SUMMARY OF THE INVENTION

Now, if all of the quartz glass substrate, optical circuits, the waveguide patterns, the clad, and the transparent plate are composed of quartz glass ($SiO_2$) in the multiple optical waveguide device, light transmits almost completely because the multiple optical waveguide device is colorless. As a result, it was very difficult for the worker to recognize visually, and to confirm the waveguide patterns and the optical circuits.

In consideration of the above-mentioned circumstances, an object of the present invention is to provide an optical waveguide device and a multiple optical waveguide device, which can recognize easily an optical circuit and a waveguide pattern by visual inspection.

To achieve the above-mentioned object, an optical waveguide device according to the present invention comprises a quartz glass substrate, an optical circuit to propagate an optical signal on said quartz glass substrate, a clad with which said optical circuit and said quartz glass substrate are covered, a transparent plate bonded to the surface of clad. Furthermore, an optical reflection film is provided on the fringing area or whole area of a joint surface of said transparent plate.

A multiple optical waveguide device according to the present invention comprises a quartz glass substrate, a plurality of optical circuits to propagate an optical signal on said quartz glass substrate, a clad with which said optical circuits and said quartz glass substrate are covered, a transparent plate bonded to the surface of said clad. Furthermore, an optical reflection film is provided on the fringing area or whole area of a joint surface of said transparent plate.

An optical reflection film of each of the optical waveguide device and the multiple optical waveguide device comprises a non-metallic substance or a metallic substance.

An excellent effect that it is possible to cut off easily and surely when the multiple optical waveguide device is cut to each optical waveguide device is obtained according to the present invention.

BRIEF DESCRIPTION OF THE DRAWINGS

FIG. 1A is a top view of a transparent plate in which an optical reflection film is provided on a fringing area, FIG. 1B is a top view seen from a quartz glass substrate to which the transparent plate is not bonded, and FIG. 1C is a top view seen from the quartz glass substrate, where the optical waveguide device to which the transparent plate is bonded is turned over.

FIG. 3A is a perspective view of a multiple optical waveguide device. FIG. 3B is a perspective view showing of an optical waveguide device obtained by cutting the multiple optical waveguide device of FIG. 3A.

DETAILED DESCRIPTION OF THE PREFERRED EMBODIMENTS

Before explaining embodiments of the present invention in detail, the conventional multiple optical waveguide device will be explained again by using attached drawings.

Figure 4:
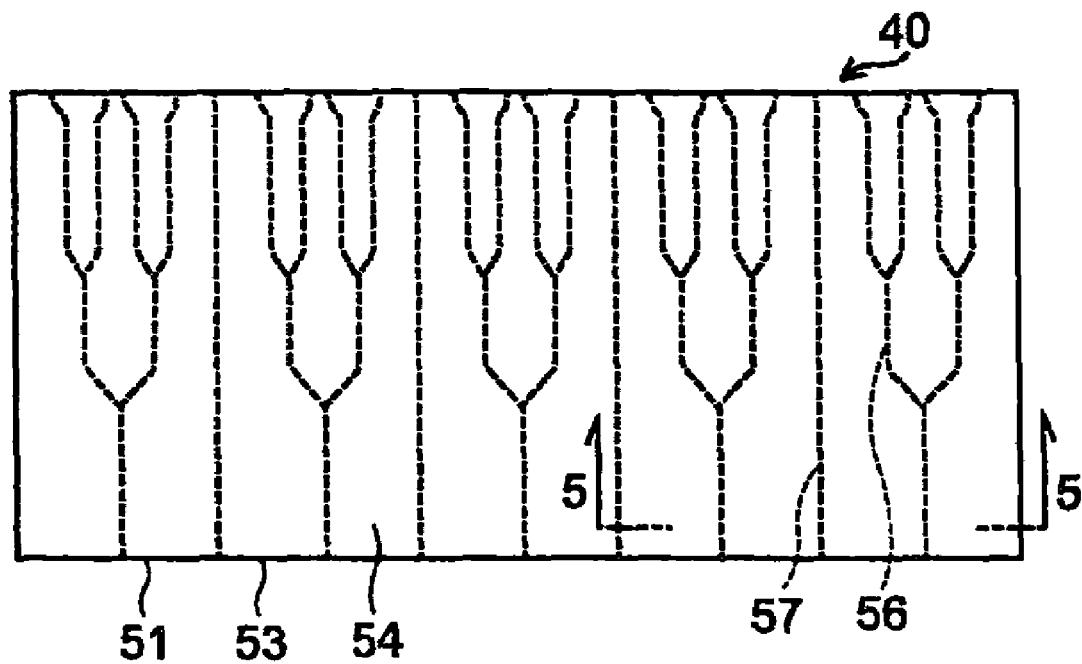
FIG. 4 is a top view of a conventional multiple optical waveguide device.

As shown in FIG. 4, the conventional multiple optical waveguide device 40 comprises a plurality of optical circuits 56 (five circuits in FIG. 4) and waveguide patterns 57 (four patterns in FIG. 4) which indicate the standard of cutting off when dicing, provided on quartz glass substrate 51. It further comprises clad 53 with which optical circuits 56, waveguide patterns 57, and quartz glass substrate 51 are covered, and transparent plate 54 bonded on the surface of clad 53. The optical waveguide device is made by cutting multiple optical waveguide device 40 along waveguide patterns 57 by using a dicing saw (not shown).

Figure 5:
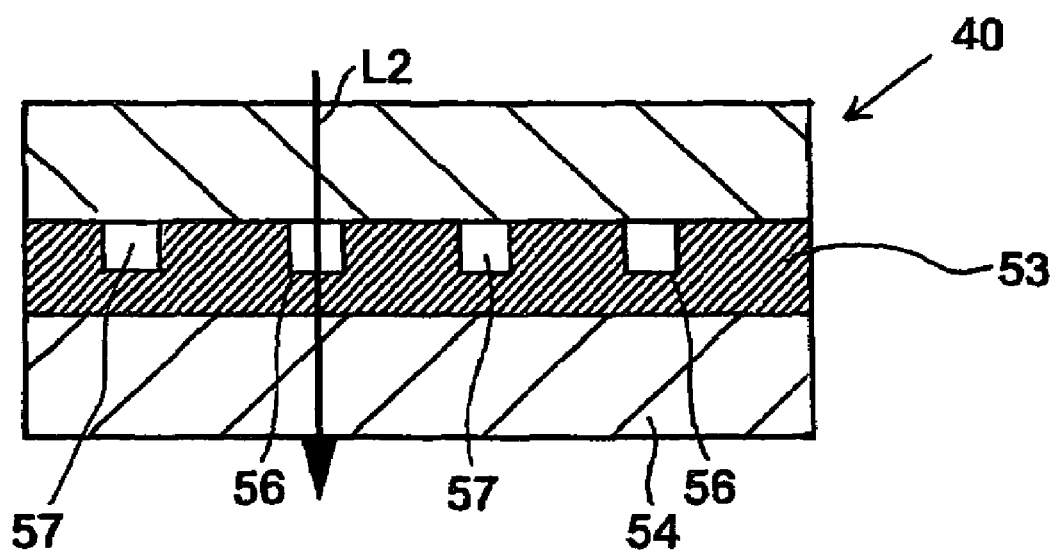
FIG. 5 is a sectional view of the multiple optical waveguide device, where the sectional structure taken along line 5-5 of FIG. 4 is turned over.

Now, FIG. 5 is a sectional view of the multiple optical waveguide device, where the sectional structure taken along line 5-5 of FIG. 4 is turned over. If all of quartz glass substrate 51, optical circuits 56, waveguide patterns 57, clad 53, and transparent plate 54 are composed of quartz glass ($SiO_2$) in multiple optical waveguide device 40, light L2 transmits almost completely because multiple optical waveguide device 40 is colorless. As a result, it was very difficult for the worker to recognize visually, and to confirm waveguide pattern 57 and optical circuit 56.

Next, preferable embodiments of the present invention which can solve the above-mentioned problem will be explained by referring to attached drawings.

Figure 1A:
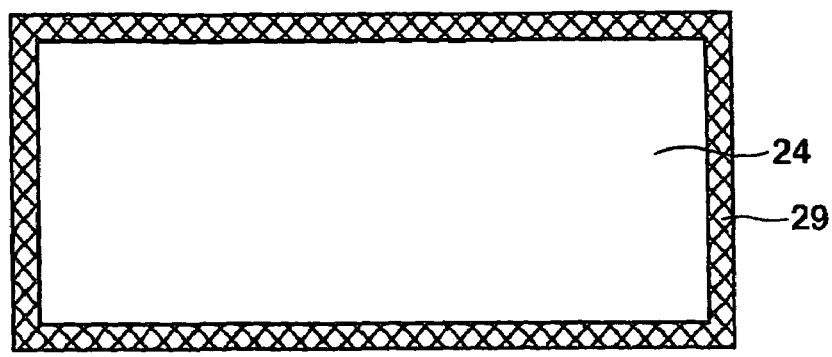
FIG. 1A, FIG. 1B and FIG. 1C are top views of a multiple optical waveguide device according to a preferable embodiment of the present invention.
Figure 1B:
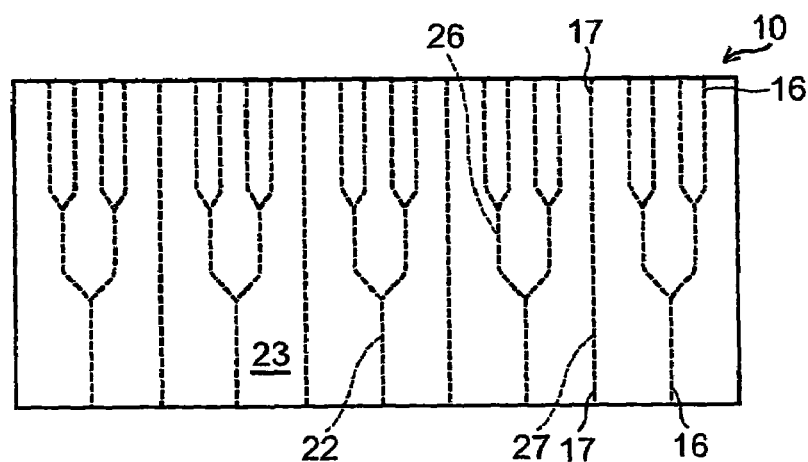
Figure 1C:
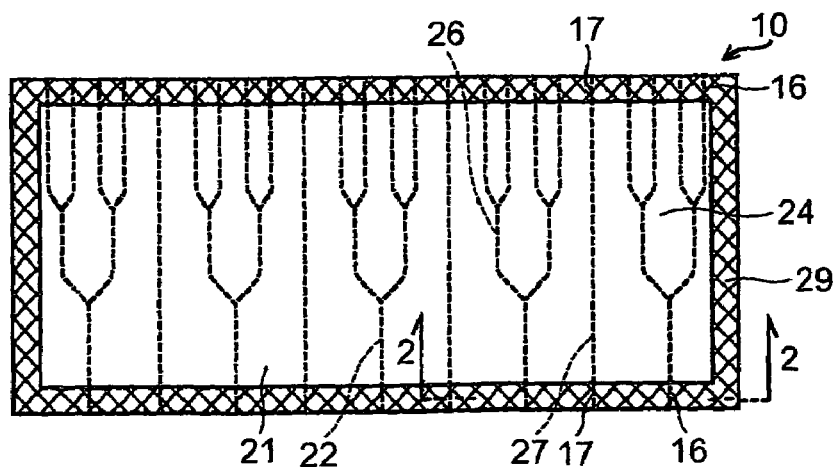
Figure 2:
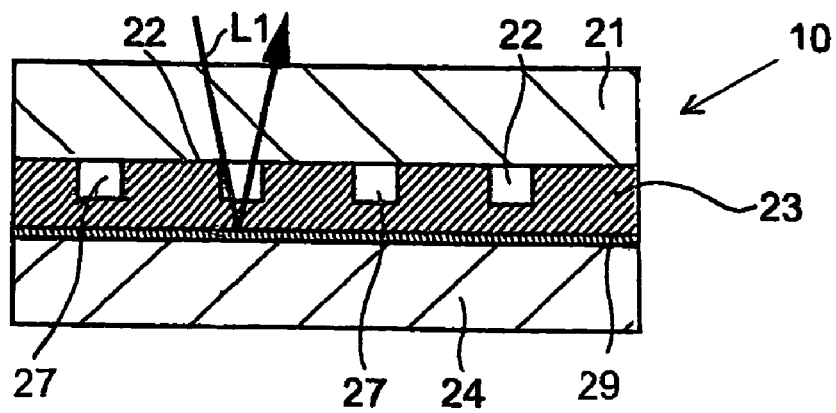
FIG. 2 is a sectional view taken along line 2-2 of FIG. 1C.

FIG. 1A, FIG. 1B and FIG. 1C are top views of a multiple optical waveguide device according to a preferable embodiment of the present invention, FIG. 1A is a top view of a transparent plate in which an optical reflection film is provided on a fringing area, FIG. 1B is a top view seen from a quartz glass substrate to which the transparent plate is not bonded, and FIG. 1C is a top view seen from the quartz glass substrate, where the optical waveguide device to which the transparent plate is bonded is turned over. FIG. 2 is a sectional view taken along line 2-2 of FIG. 1C.

As shown in FIG. 1A to FIG. 1C and FIG. 2, a multiple optical waveguide device 10 according to an embodiment of the present invention comprises a plurality of optical circuits 26 (five circuits in FIG. 1C) composed of a quartz glass system waveguide 22 and waveguide patterns 27 (four patterns in FIG. 1C) which indicate the standard of cutting off when dicing, provided on quartz glass substrate 21. It further comprises clad 23 with which optical circuits 26, waveguide patterns 27, and quartz glass substrate 21 are covered, and transparent plate 24 bonded or joined on the surface of clad 23. In addition, optical reflection film 29 is provided on a fringing area of a joint surface of the transparent plate 24 with clad 23.

The fringing area on the joint surface of transparent plate 24 with clad 23 composes the optical reflection area (hatching area of FIG. 1C). Here, as the area of the optical reflection film 29 provided to the side of the joint surface of the transparent plate 24 with clad 23 increases, the joint power between clad 23 and transparent plate 24 might gradually decrease. It is, therefore, desirable that the optical reflection film 29 is provided on the fringing area on the side of the joint surface of the transparent plate 24 with clad 23.

Optical reflection film 29 is composed of amorphous silicon (a-Si) or silicon (Si), etc. which is the non-metallic substance. Further, it is possible to compose optical reflection film 29 of gold (Au), titanium (Ti), or alminum (Al), etc. which is the metallic substance. When amorphous silicon, or silicon, etc. which is the non-metallic substance is used as a configuration material of optical reflection film 29, the warp of the optical waveguide device is small because the value of the coefficient of linear expansion of amorphous silicon or silicon is close to that of quartz which is the material of the optical waveguide device. Therefore, the adverse effect on an optical characteristic and reliability can be prevented. Moreover, the visual confirmation can be done easily because the reflectivity of metal is better than a non-metallic material when the metal is used as a material of optical reflection film 29. A CVD (Chemical Vapor Deposition) method, the vacuum evaporation method or a sputtering process, etc. is enumerated as a method of forming optical reflection film 29.

Optical reflection film 29 only has the thickness by which light L1 (see FIG. 2) can be reflected enough. The thickness is preferably 0.05-2.0 μm, and more preferably 0.1-1.0 μm, but it is not limited to a specific value. The reason for this is that the bondability of clad 23 and transparent plate 24 decreases when the thickness of optical reflection film 29 is too thick.

As the material of quartz glass substrate 21, waveguide 22, clad 23, and transparent plate 24, all materials used commonly as a quartz material for an optical waveguide can be used, and it is not limited to a specific material.

The operation of multiple optical waveguide device 10 according to this embodiment will be explained next.

Optical reflection film 29 is provided on the fringing area on the side of joint surface of transparent plate 24 in multiple optical waveguide device 10 as shown in FIG. 1A and FIG. 1C. Optical reflection film 29 is colored to reflect light. Therefore, incident light L1 from the side of the quartz glass substrate 21 of multiple optical waveguide device 10 can be reflected in optical reflection film 29 as shown in FIG. 2.

At this time, edge 16 of each of optical circuits 26 and edge 17 of each of waveguide patterns 27 are located on optical reflection film 29 as shown in FIG. 1C. Because optical circuit 26 and waveguide pattern 27 are different in refractive index from clad 23 (see FIG. 2), Appearance of the waveguide, that is, the color and the tone are different in each edge 16, 17, and clad 23 when light is reflected. Therefore, when the worker looks into multiple optical waveguide device 10 from the side of the quartz glass substrate 21, each of edges 16 and 17 can be recognized and confirmed easily by optical reflection.

As a result, the worker can cut off the optical waveguide device easily and surely by making each edge 17 of waveguide pattern 27 a standard with the side of the quartz glass substrate 21 of multiple optical waveguide device 10 directed above and dicing multiple optical waveguide device (for instance, each 1×4 optical splitter in FIG. 1C). Because not only each edge 17 of waveguide patterns 27 but also each edge 16 of optical circuits 26 can be recognized by visual inspection, each optical waveguide device can surely be cut off even if it is difficult to recognize each edge 17 of waveguide patterns 27 by visual inspection.

An example of multiple optical waveguide device 10 according to this embodiment has been explained, where optical reflection film 29 is provided on the whole fringing area on the side of the joint surface of the transparent plate 24 with clad 23. However, optical reflection film 29 can be provided on each edge 16 of optical circuits 26 and each edge 17 of waveguide patterns 27 as shown in FIG. 1C, or, at least on each edge 17 of waveguide pattern 27, or in the range where each edge 16 of optical circuit 26 can be recognized by watching. Therefore, the position of optical reflection film 29 is not limited to the above-mentioned embodiment.

For instance, because the both edges (right and left edges in FIG. 1C) which have the cutting off part of multiple optical waveguide device 10 (edges 16 and 17) includes neither edges 16 and 17, optical reflection film 29 need not be provided. Therefore, it is possible to provide optical reflection film 29 only to the sides corresponding to the fringing area on the side of the joint surface 28 of transparent plate 24 and both edges of the cutting off part. As a result, the cost of raw material of optical reflection film 29 can be decreased.

Figure 3A:
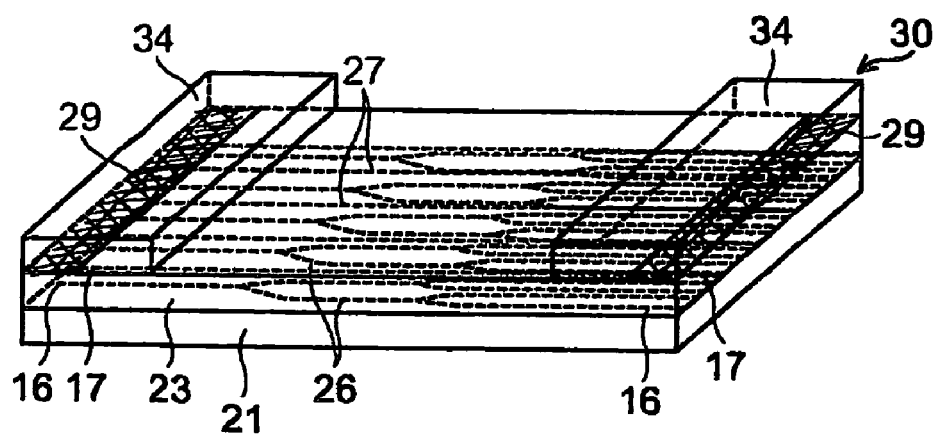
FIG. 3A and FIG. 3B are perspective views showing a modified embodiment of the present invention.
Figure 3B:
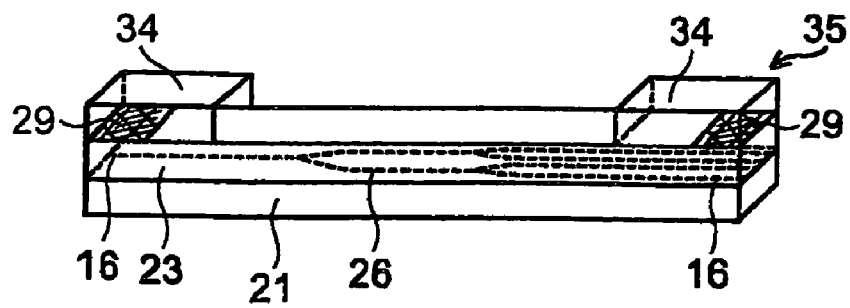

Moreover, transparent plate 24 need not be one-piece board although in multiple optical waveguide device 10 according to this embodiment, one transparent plate 24 is provided to whole area of clad 23. For instance, it is possible to use multiple optical waveguide device 30 in which convex transparent plates 34 are bonded to both edges as shown in FIG. 3A. In this case, optical reflection film 29 is provided on a part or the whole area of the joint surface of convex transparent plate 34 as well as the above-mentioned example in which one transparent plate 24 is provided to the whole area of clad 23. Moreover, optical waveguide device 35 shown in FIG. 3B is obtained by cutting the multiple optical waveguide device 30 along waveguide pattern 27 by using a dicing saw (not shown).

In addition, when edge 16 of optical waveguide device 35 or multiple optical waveguide device 10 and an optical fiber or an optical fiber array (not shown) are matched at the core and bonded to each other, it becomes possible to recognize easily each edge 16 and to shorten the assembly time.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An optical waveguide device comprising:
   a quartz glass substrate,
   an optical circuit to propagate an optical signal on said quartz glass substrate,
   a clad with which said optical circuit and said quartz glass substrate are covered, and
   a transparent plate joined to a surface of said clad,
   wherein an optical reflection film is provided on a fringing area or whole area of a joint surface of said transparent plate with said clad.

2. The optical waveguide device according to claim 1, wherein said optical reflection film comprises a non-metallic substance.

3. The optical waveguide device according to claim 1, wherein said optical reflection film comprises a metallic substance.

4. A multiple optical waveguide device comprising:
   a quartz glass substrate,
   a plurality of optical circuit to propagate an optical signal on said quartz glass substrate,
   a clad with which said optical circuit and said quartz glass substrate are covered, and
   a transparent plate joined to a surface of said clad,
   wherein an optical reflection film is provided on a fringing area or whole area of a joint surface of said transparent plate with said clad.

5. The multiple optical waveguide device according to claim 4, wherein said optical reflection film comprises a non-metallic substance.

6. The multiple optical waveguide device according to claim 4, wherein said optical reflection film comprises a metallic substance.

* * * * *